United States Patent

Lin et al.

[11] Patent Number: 5,574,948
[45] Date of Patent: Nov. 12, 1996

[54] METHOD FOR SEPARATING JUMPLESS ADD-ON CARDS HAVING IDENTICAL I/O PORT ONTO DIFFERENT I/O PORTS BY USING COMPARISON TECHNIQUE BASED ON THE CARD NUMBERS

[75] Inventors: Su-Chu Lin, Hsin-Chu; Jeng-Fang Chiou, Pin-Chan, both of Taiwan

[73] Assignee: United Microelectronics Corp., Hsin-Chu, Taiwan

[21] Appl. No.: 295,969

[22] Filed: Aug. 25, 1994

[51] Int. Cl.⁶ .................................................. G06F 15/02
[52] U.S. Cl. .................. 395/830; 364/231.5; 364/237.9; 364/239.9
[58] Field of Search ................................... 395/821, 800, 395/823, 822, 830

[56] References Cited

U.S. PATENT DOCUMENTS

| | | |
|---|---|---|
| 4,300,207 | 11/1981 | Eivers et al. .......................... 395/311 |
| 4,674,082 | 6/1987 | Flanagin et al. .......................... 370/60 |
| 4,725,835 | 2/1988 | Schreiner et al. .................. 340/825.83 |
| 4,760,553 | 7/1988 | Buckley et al. .................... 395/183.21 |
| 5,454,078 | 9/1995 | Heimsoth et al. ....................... 395/829 |

Primary Examiner—Thomas C. Lee
Assistant Examiner—Moustafa Mohamed Meky
Attorney, Agent, or Firm—Barnes, Kisselle, Raisch, Choate, Whittemore & Hulbert, P.C.

[57] ABSTRACT

A method of separating jumpless add-on cards having identical I/O ports onto different I/O ports by first providing a special comparator in the hardware and then providing a software program to produce different responses from different add-on cards even though such cards are using the same I/O ports.

8 Claims, 5 Drawing Sheets

METHOD FOR SEPARATING JUMPLESS ADD-ON CARDS HAVING IDENTICAL I/O PORT ONTO DIFFERENT I/O PORTS BY USING COMPARISON TECHNIQUE BASED ON THE CARD NUMBERS

FIELD OF THE INVENTION

The present invention generally relates to a method to separate jumpless add-on cards having identical I/O ports onto different I/O ports and more specifically, relates to a method of separating jumpless add-on cards having identical I/O ports onto different I/O ports by first providing a comparator in the hardware and then providing a software program to produce different responses from different add-on cards even when such cards are using the same I/O ports,

BACKGROUND OF THE INVENTION

In computers, it is common to use more than one of the same type of add-on cards and to assign them to different I/O ports. For instance, two add-on cards for hard disk controls and two or more network interface cards are frequently used in computers. When the add-on cards used are of the jumpless type, the operation of the cards must be controlled by specific software programs supplied by the card manufacturers. Since there are no jumpers on the cards, it is impossible to tell the content from the appearance of the cards. As a consequence, interferences between the cards frequently occur which lead to computer down time.

Presently, jumpless add-on cards use designated I/O ports to read or to change the designated content. When the I/O ports on the same card has the same definition of functions, the same response from the card is obtained. When a multiple number of add-on cards all have the same designated I/O ports, the same response is obtained from the program such that it is impossible to distinguish whether the card that is operating is a single card or a multiple number of cards. Even when the designation on the cards are changed, cards using the same I/O port would change accordingly such that it is still impossible to distinguish the cards. In a prior art method, the user of a computer manually designates each one of the add-on cards and then insert them back into the computer. This is a laborious task and frequently causes other problems.

It is therefore an object of the present invention to provide a method to separate jumpless add-on cards having identical I/O ports onto different I/O ports without the shortcomings of the prior art method.

It is another object of the present invention to provide a method to separate jumpless add-on cards having identical I/O ports onto different I/O ports by providing a special comparator in the computer hardware.

It is a further object of the present invention to provide a method to separate jumpless add-on cards having identical I/O ports onto different I/O ports by providing a special comparator in the computer hardware and by utilizing a software program to manipulate such that different response can be obtained even though the add-on cards are using the same I/O ports.

It is yet another object of the present invention to provide a method to separate jumpless add-on cards having identical I/O ports onto different I/O ports by using a comparator and a software program such that when different responses are received from the add-on cards, the software detects the same I/O port being used by different add-on cards and thus separate them onto different I/O port to solve the problem of I/O port designation conflicts.

SUMMARY OF THE INVENTION

In accordance with the present invention, a method to automatically separate jumpless add-on cards having identical I/O port onto different I/O ports is provided.

In the preferred embodiment, in order to separate jumpless add-on cards having identical I/O ports onto different I/O ports, a special comparator is added in the computer hardware and operated by a software program such that even when several add-on cards of the same type are designated to the same I/O ports, a different response is received from each of the cards. Based on the different responses received from each of the cards, the software program can detect which ones of the multiple add-on cards are using the same I/O ports and consequently, dividing them and assigning them to different I/O ports.

BRIEF DESCRIPTION OF THE DRAWINGS

Other objects, features and advantages of the present invention will become apparent upon consideration of the specification and the appended drawings, in which.

DETAILED DESCRIPTION OF THE PREFERRED EMBODIMENT

The present invention discloses a method of separating jumpless add-on cards having identical I/O ports onto different I/O ports by first providing a special comparator in the computer hardware and then providing a software program to produce different responses from different add-on cards even though such cards are using the same I/O ports.

The present invention method can be divided into three major steps. The first step is to assign a specific number to each add-on card. Such numbers are not repeated and have a predetermined numerical range. For instance, on a network interface card, each add-on card has a unified number in the range from 000h to 7FFFFFFFFFFFh.

Figure 1:
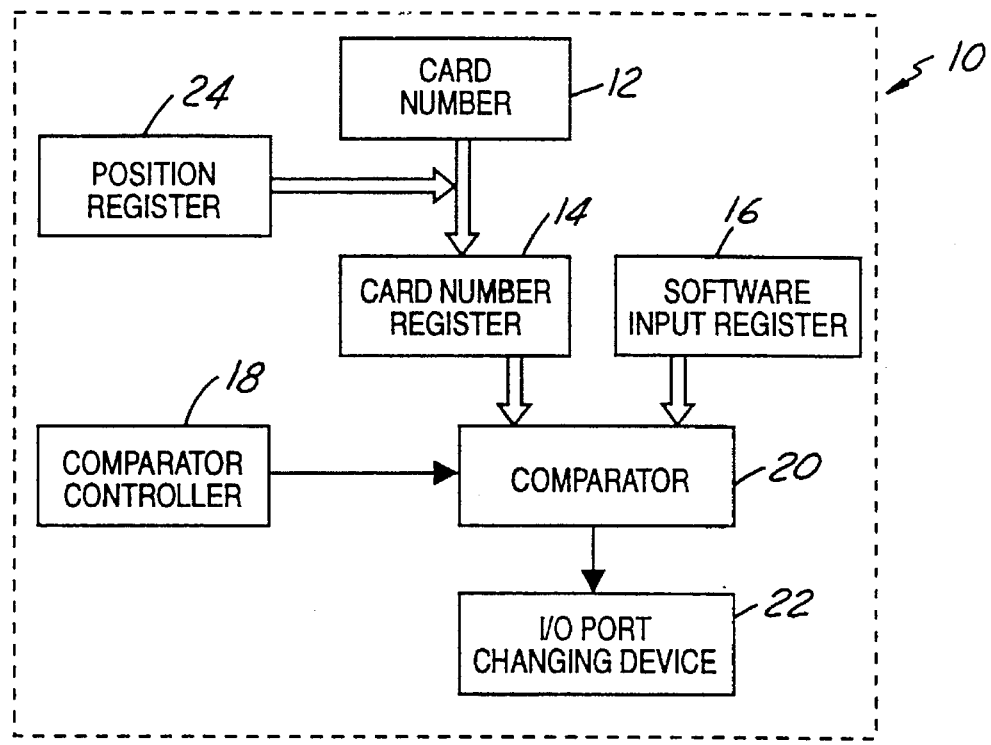
FIG. 1 is a block diagram illustrating the computer hardware of the present invention.

The second step is to equip the computer hardware 10 with the following six components. This is shown in FIG. 1. Code 12 is stored into code register 14 when the computer is first turned on or when the code register is first used. Software input register 16 which has the same size register as that of the code register 14, however, the content of the software input register 16 is directly inputted from the software. A comparator controller 18 which is used to control the enabling or disabling of comparator 20. The signal content of the controller 18 is inputted from the software directly, it is disabled when the computer is turned on. The comparator 20 utilizing a comparison relationship ($\geq$, $\leq$, $>$ or $<$) to compare the content of the code register 14 and the software input register 16 and then outputs either a high voltage or a low voltage. Furthermore, the comparison action of the comparator 20 is controlled by the comparator controller 18. When the signal sent by the comparator controller 18 is to "enable", comparator 20 proceeds with an action of comparison. When the signal sent out by the comparator controller 18 is to "disable", the output from the comparator 20 is a constant voltage. The action of the I/O port changing device 22 is based on the output from the comparator 20 and the operation of a software program.

The software program uses a series of instructions to change the position of the I/O ports. The content of the output from comparator 20 determines whether the position of the I/O ports should be changed or should not be changed. When the output from the comparator 20 is to "enable", the position of the I/O ports will change according to the input from the software program. When the output from comparator 20 is to "disable", the position of the I/O ports will not change according to the input of the software program. A pointer register 24 is used to reduce the time and frequency required to find a code in order to practice the present invention. The use of the pointer register 24 is not absolutely necessary for the present invention. However, in order to avoid repetition of the numbers on the card based on the fact that most ranges of the code are very large and almost off the cards which leads to difficult handling by the software program and excessive execution time which would otherwise render the present invention impractical. For instance, for a code range from 0h to 7FFFFFFFFFFFh on a network interface card, if it is necessary to find a number within this range, then the maximum number for trial is 7FFFFFFFFFFFh times. However, if this is divided into groups of 8 bit, then the number of trials required is only 7Fh+5(FFh). Consequently, the time and frequency necessary for seeking such a number is drastically reduced. For simplicity, in the following discussions, the above-described add-on card equipped with the six components is called the hardware.

The software program used by the present invention can be divided into three main parts or modules. These are the modules for distinguishing the I/O ports that are in use and the I/O ports that are not in use, the module for locating the I/O ports of the hardware and then separating the hardware with other add-on cards, and the module for separating the add-on cards that share the same I/O ports of the hardware and then assigning the cards to an unused I/O ports.

Figure 2:
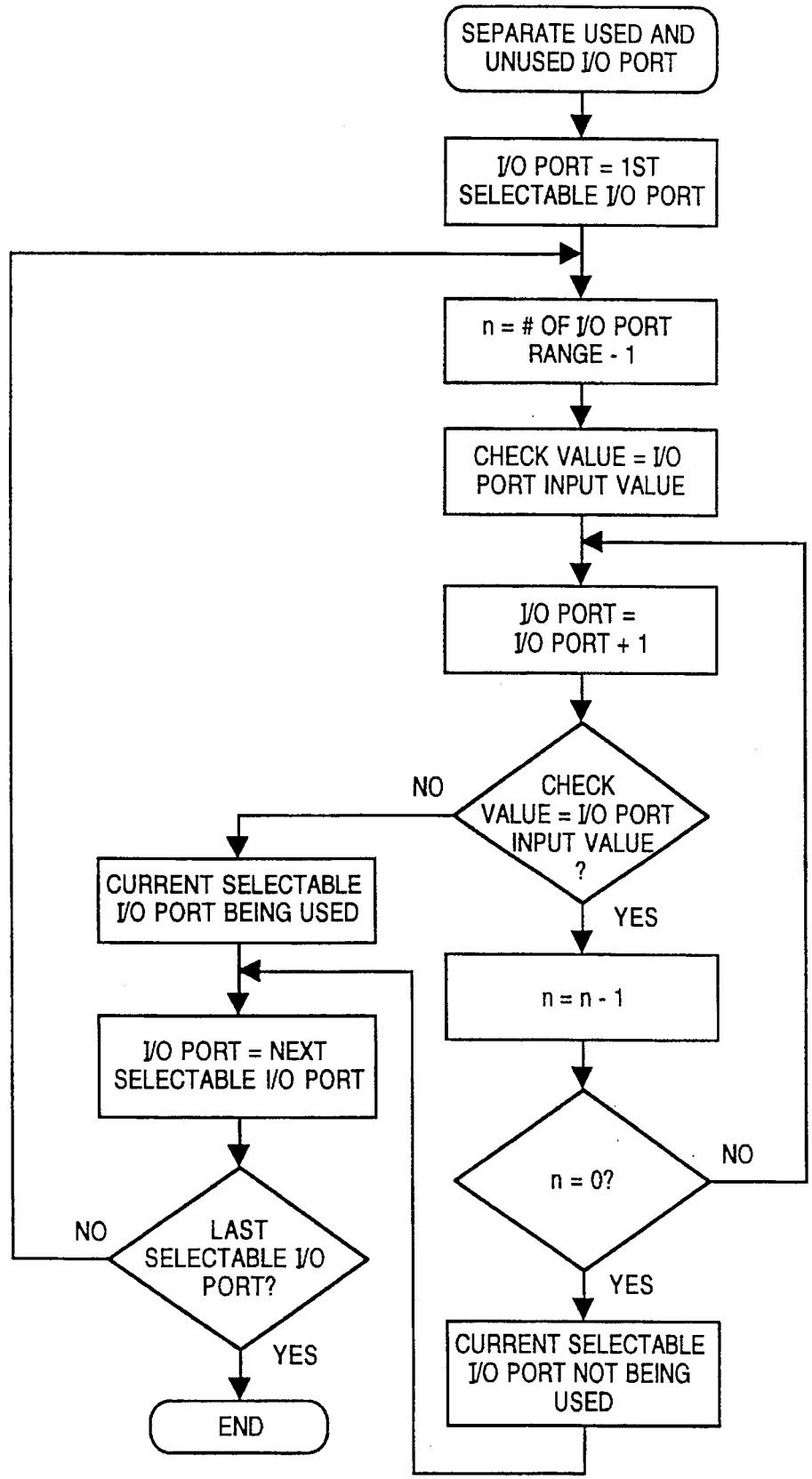
FIG. 2 is a flow chart illustrating the software module of the present invention for distinguishing the used and unused I/O ports.

A flow chart of the module for distinguishing the I/O ports in use and the I/O ports not in use is shown in FIG. 2. It is used to find within a set of available I/O ports of the hardware, which ports are already occupied by other add-on cards and which ports are not occupied. The I/O ports that are not occupied can be used to distinguish the add-on cards that are in conflict.

Figure 3:
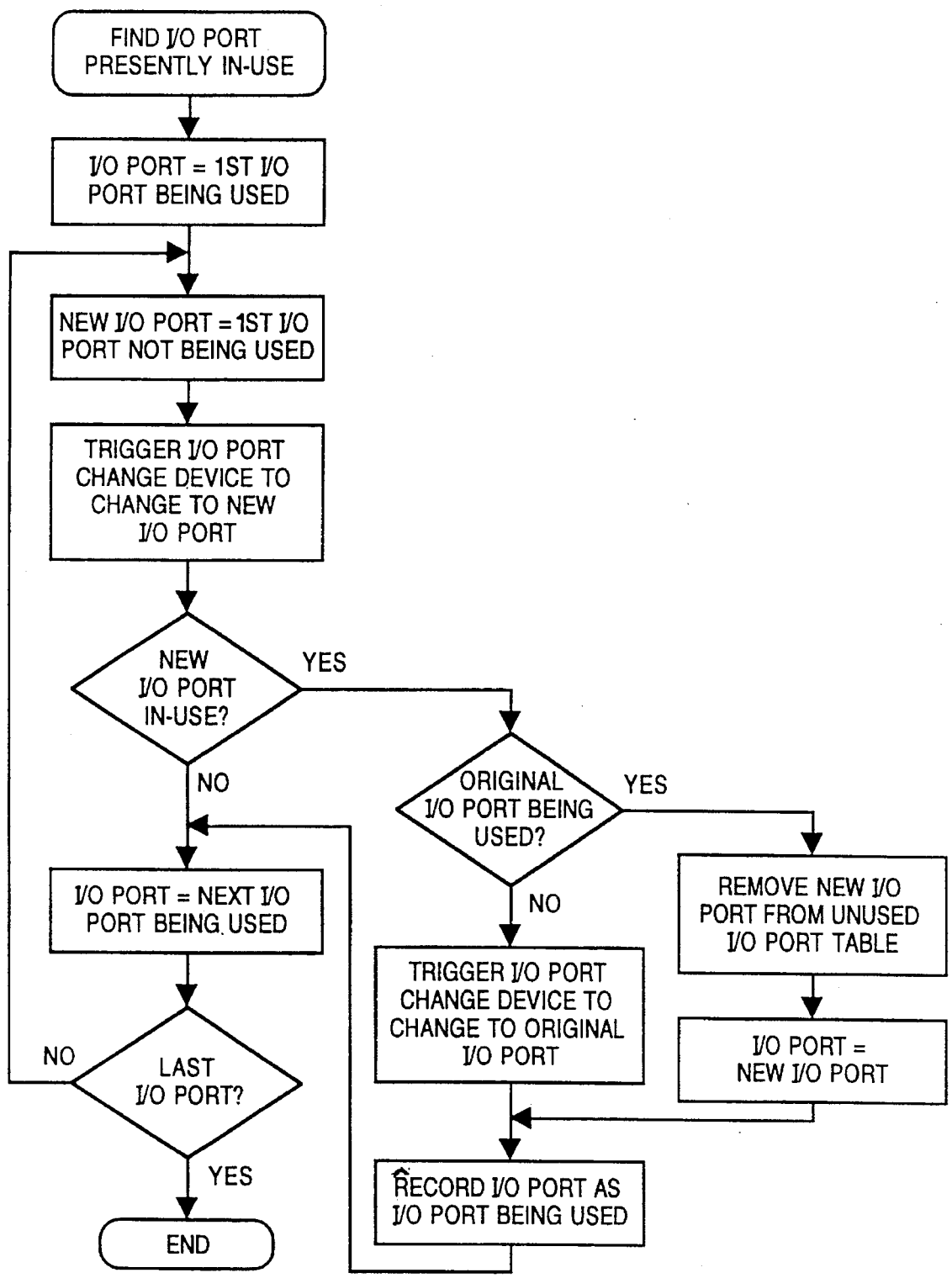
FIG. 3 is a flow chart illustrating a software module of the present invention for locating the I/O ports used by the present hardware.

FIG. 3 shows the flow chart of the module for locating the I/O ports of the hardware and then separating the hardware with other add-on cards. It can separate the hardware and other add-on cards and, further, finds the I/O ports which carry the hardware. It is executed by the I/O port changing device 22 (FIG. 1). When the comparator 20 is disabled by the comparator controller 18 through the operation of the software, as soon as the software program enables the I/O port changing device 22, it switches the I/O ports of the add-on card to another unused I/O port. While at the same time, if the add-on card cannot use the software, i.e. it is not equipped with the hardware shown in FIG. 1, then the I/O ports will not change. It can thus be detected that if the software program changes those already occupied I/O ports gradually into unused I/O ports, three possible conditions may exist.

First, the originally used I/O ports and the newly replaced I/O ports are both being used. This indicates a situation where on the originally used I/O ports, before the software program was executed, the hardware and other add-on cards are both using these I/O ports. The I/O port changing device 22 is operated by the software program to switch the hardware onto an unused I/O port.

Secondly, the originally used I/O ports, through the software operation, switched into unused I/O ports and further, the newly switched I/O ports are in use. This indicates a situation where the originally used I/O ports, before the execution of the computer software, only the hardware is in use.

Thirdly, after the execution of the software, the newly switched I/O ports are still unused. This indicates a situation where the originally used I/O ports, before the execution of the software, do not have the hardware in existence.

Figure 4A:
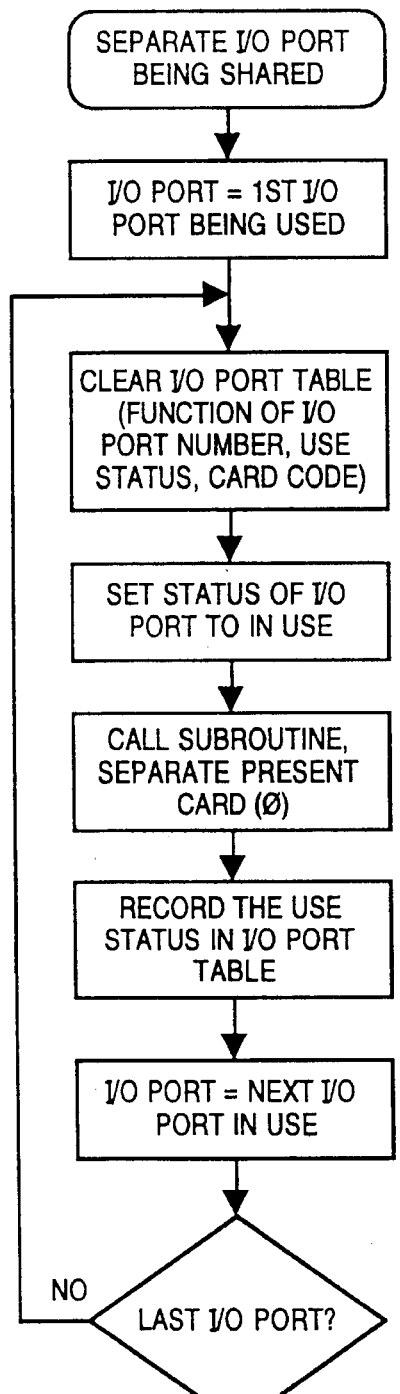
FIG. 4A is a flow chart of the software module of the present invention for distinguishing the add-on cards that is using the same I/O ports with the present hardware.
Figure 4B:
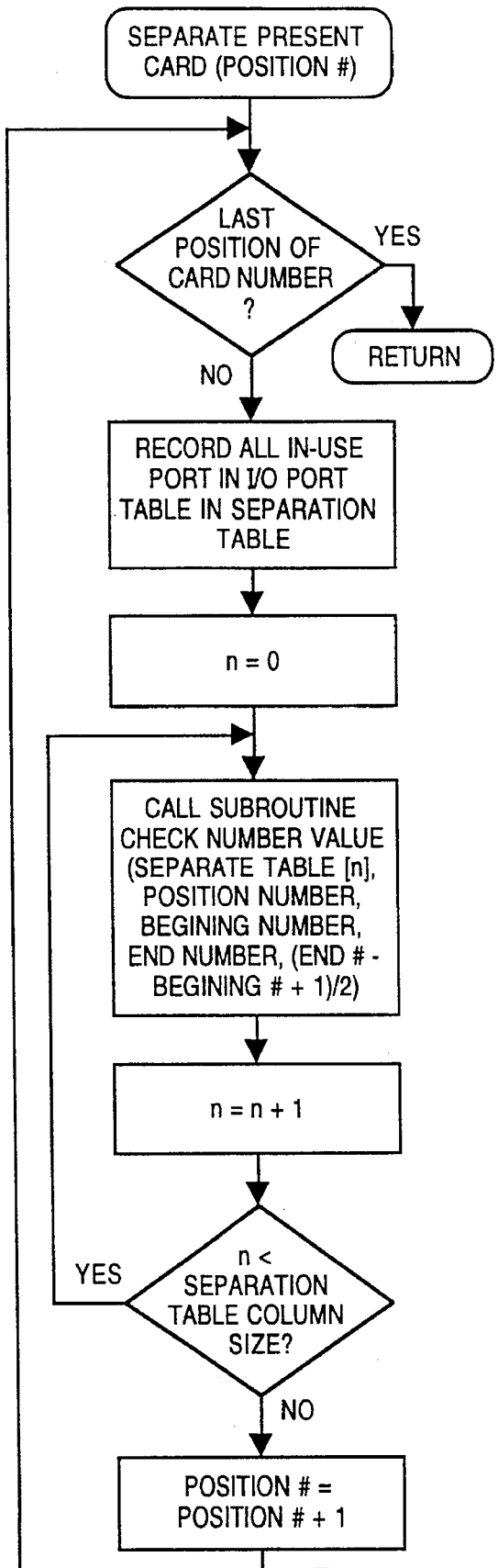
FIG. 4B is a flow chart of the subroutine of the present invention for distinguishing the present hardware card.
Figure 4C:
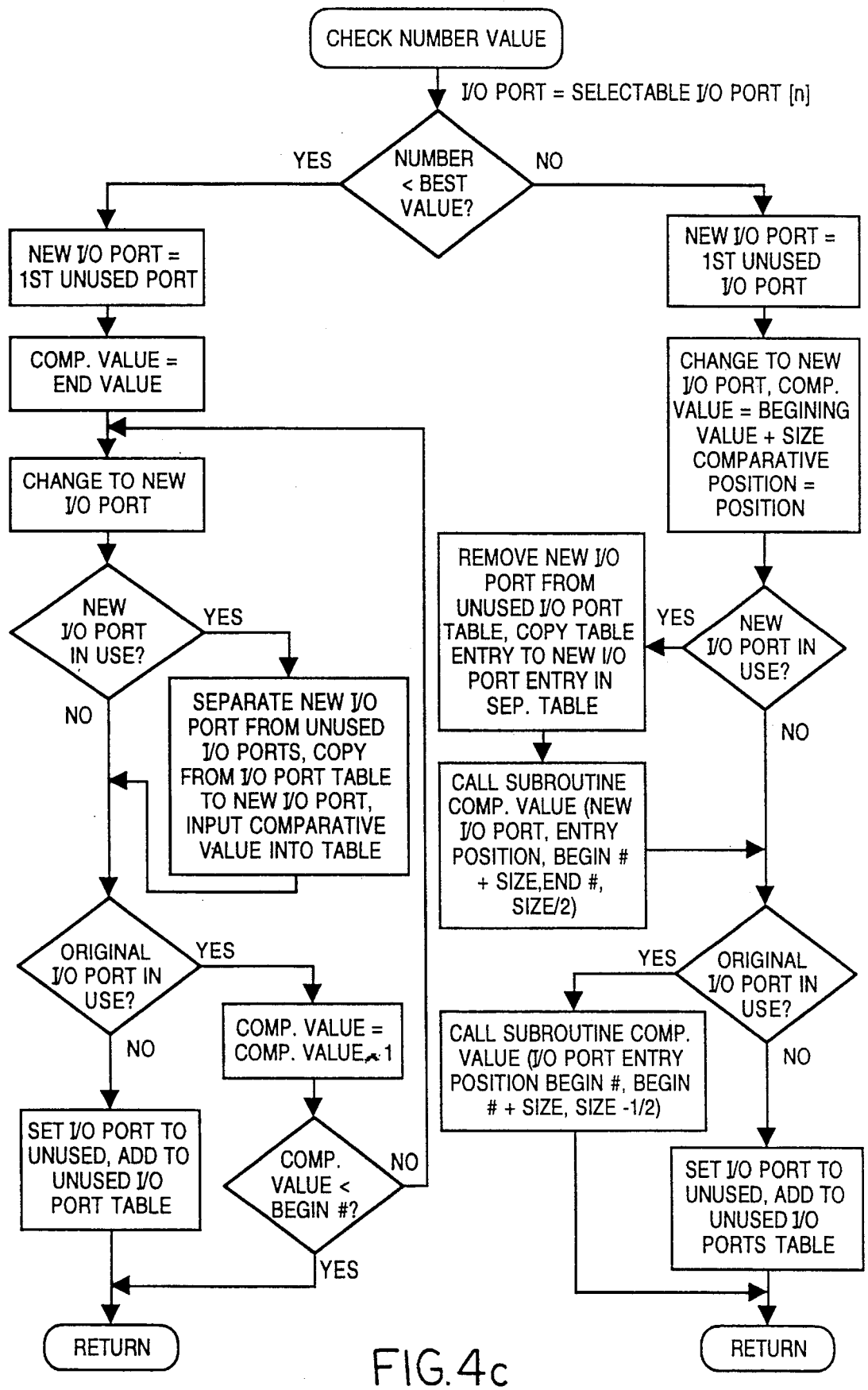
FIG. 4C is a flow chart illustrating of the subroutine of the present invention software program for numerical code inspection.

Based on the above three alternatives, it is possible to distinguish the hardware in other add-on cards. Furthermore, it is also possible to locate which I/O ports have the existence of the hardware. The software module to separate the add-on cards that are sharing the same I/O ports with the hardware and then assigns the card to unused I/O ports. The flow charts of this module is shown in FIGS. 4a through 4c. In this hardware, each add-on card hardware has a unified card number 12 as shown in FIG. 1. This number is within a predetermined range and cannot be repetitive. When the software enables the comparator 20 (FIG. 1) and starts its operation, depending on the nature of the comparator, a number inputted from the software in the software input register 16 in sequence is compared to the number 14 from the card number register 12. This resulted in a numerical value. The next number changes the position of the I/O port to obtain a card number on an add-on card for this number. For instance, when the comparator 20 has the characteristic of the card number 12> or = to the input number such that the I/O ports positions are changed, if the card number 12 is equal to 20h, the software input number reduces sequentially from FFh. When the input number is changed from 21h to 20h, the I/O port changing device is enabled to change the positions of the I/O ports. By using this method, when two or more add-on cards are using the same set of I/O ports, it can sequentially increase or reduce the input number to compare with the card number on the various add-on cards. Furthermore, the results of this comparison determines whether the positions of the I/O ports needs to be changed such that they can be distinguished.

The program sequence of the present invention is therefore to first distinguish those already in-use I/O ports and those unused I/O ports, locating the I/O ports of the hardware and then separating the hardware and other add-on cards such that the hardware and other add-on cards not equipped with the hardware shown in FIG. 1 may be separated, and then separating those add-on cards that are sharing the same I/O ports with the hardware such that those cards can be assigned to unused I/O ports, so that the add-on cards that are using common I/O ports of the hardware can be separated and distinguished.

The above method even though achieves the goal of separating multiple add-on cards that are sharing common I/O ports, due to the fact that the range of the numbers is very large (in order to avoid repetitive numbers), if all the numbers are compared according to the above method, a long time is necessary for such comparison and thus greatly reduced the efficiency and practicality of the present invention. Therefore, the present invention further utilizes a pointer register and the technique of binary search to execute the comparison in order to shorten the time necessary for such process.

The present invention divides a card number into several segments, and then utilizes a pointer register 24 (FIG. 1) to indicate their positions. For instance, for a card number of 35486F66h, it can be divided into four separate numbers of 35, 48, 6F, 66. The pointer register is then used to indicate the position number, for instance the position number for 35 is 3, the position number for 66 is 0. When a comparison is made, the range of the position number is only between 0h to FFh. The number of comparisons made is proportional to the magnitude of the position number and not proportional to the exponent of the position number.

When the card number is divided into several position numbers, if the previously stated method of increasing or decreasing input member from the software is used, in order to find all the hardware the complete range of numbers must be compared. This is again a very time consuming task. The present invention therefor adopts another method of a binary search to execute the comparison. It is based on the range of every position number after being divided from the card number and then choosing an intermediate number. When the results of the comparator is the card number $\leq$ to input number such that it will change the position of the I/O ports, then whenever the card number is $\geq$ to the intermediate number, it is switched to the newly changed I/O port position. All others are not changed.

Therefore, when a binary search method is used, three different conditions exist for each intermediate value input. First, at least one card number is $\geq$ the intermediate number and further at least one card number is smaller than the intermediate number, this indicates the newly switched I/O port and the originally used I/O port are both occupied. Secondly, when at least one card number $\geq$ intermediate number, and none of the card number is smaller than the intermediate number, it indicates only the newly switched I/O port is being used. Thirdly, when at least one card number is smaller than the intermediate number and that no card number $\geq$ intermediate number, this indicates that only the originally used I/O port is being used.

Figure 5:
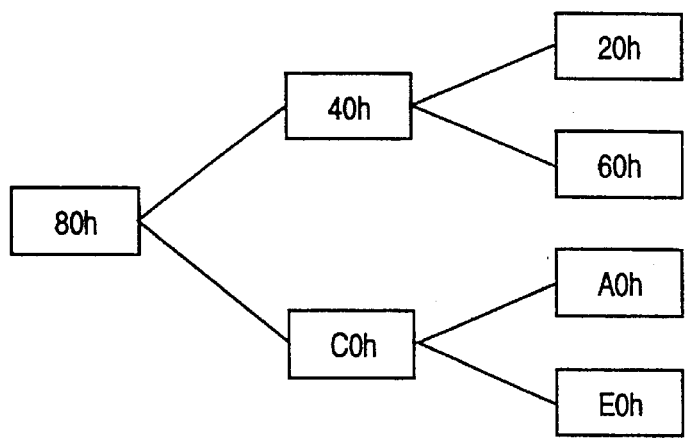
FIG. 5 is a network interface card illustrating the present invention binary search method for selecting an intermediate code.

By using this method, it is not necessary to inspect the unused range by the hardware. Since every time the binary search is used, the range for inspection is reduced to half and therefor the number of comparison can be greatly reduced. The binary search method can also be explained by the above-described network card. The range of the network card is 0h to 7FFFFFFFFFFFh. To divide every octagonal position number into a single position number such as 7Fh, FFh, FFh, FFh, FFh, FFh6 six position numbers, if the binary search method is not used and the comparison is executed by the software, then a total number of comparison necessary is $2^8 \times 5 + 2^7 = 1408$ times. As shown in FIG. 5, the binary search method is used on each position number and that the intermediate number is taken first as 80h, and then as 40h and C0h. In the computer, the number of the same type of add-on card can not exceed the number of the add-on cards slots, therefor when four network interface cards are using a common I/O port, the maximum number for comparison required by using the binary search method is only $(1+2+4\times8)\times6=210$ times.

While the present invention has been described in an illustrative manner, it should be understood that the terminology used is intended to be in a nature of words of description rather than of limitation.

Furthermore, while the present invention has been described in terms of a preferred embodiment thereof, it is to be appreciated that those skilled in the art will readily apply these teachings to other possible variations of the invention.

The embodiments of the invention in which an exclusive property or privilege is claimed are defined as follows:

1. A method to separate a plurality of jumpless add-on cards having identical sets of I/O ports onto different I/O ports wherein each of said add-on cards being equipped with a card number, a card number register, a software input register, a comparator controller, a comparator, and an I/O port changing device, said method comprising the steps of:

(a) distinguishing among a set of I/O ports used by a first one of said add-on cards the set of I/O ports that are used by a second one of said add-on cards and the ports that are not used by any other of said jumpless add-on cards, (b) activating said I/O port changing device to switch the position of an I/O port of said first one of said jumpless add-on cards to an unused I/O port when said comparator is disabled by said comparator controller, (c) separating said first one of said jumpless add-on cards from one or more other add-on cards different from said jumpless add-on cards not equipped with said card number register, said comparator and said I/O port changing device, and locating the I/O port that contain said add-on card, (d) comparing the content of said card number register and said software input register by said comparator to produce a comparison result, and (e) outputting the comparison result from step (d) to said I/O port changing device and determining the changing or not changing of said I/O port based on said comparison result such that two add-on cards utilizing the same I/O port can be distinguished.

2. A method according to claim 1 further comprising the step of using said card number register on each of said jumpless add-on cards to store the card number of each of said jumpless add-on cards for use when a computer having the jumpless add-on cards installed therein is first turned on.

3. A method according to claim 2 further comprising the step of outputting said card number to said comparator for the process of comparison.

4. A method according to claim 1 further comprising the step of using control software to directly input said card number into said software input register on said add-on card, and further outputting said number to said comparator for the process of comparison.

5. A method according to claim 1 further comprising the step of utilizing said I/O port changing device to control a software operation and to determine wether to change the I/O port position of said add-on card based on the output of a comparison result from said comparator.

6. A method according to claim 1, wherein said card number on said add-on card is a non-repetitive number having a predetermined range.

7. A method according to claim 1, wherein said add-on card further comprises a pointer register used to indicate a position number after said card number being divided into an even number of equal parts.

8. A method according to claim 1 further comprising the step of presetting an intermediate number to divide a number range into two halves based on the range of a number from said comparator, using said comparator to compare said intermediate number and said card number to stop the comparison procedure when said range does not exist on said add-on card, or repeating said comparison step when said range is covered by said add-on card.

* * * * *